Figure 1:
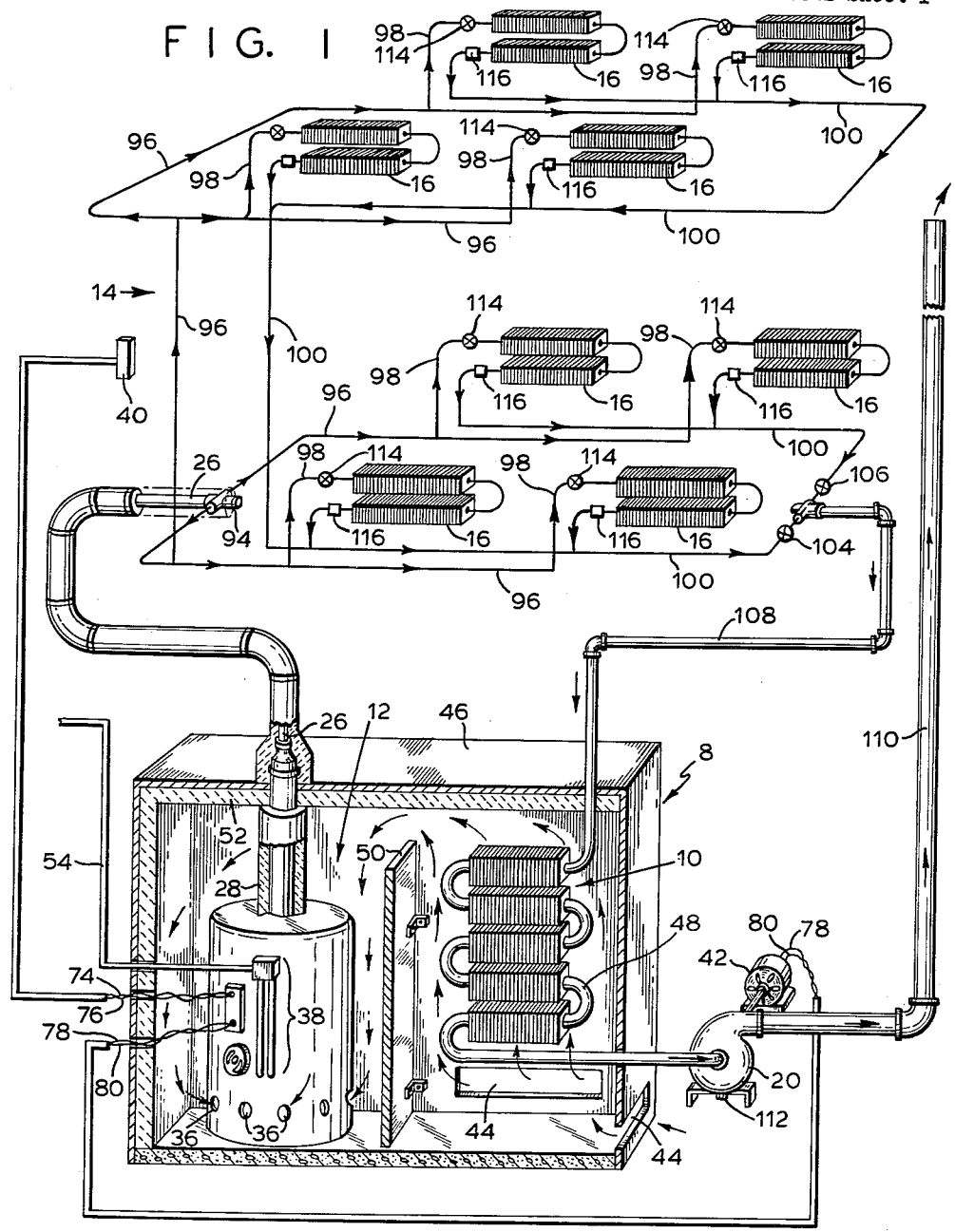

April 23, 1963

A. SHIMKO 3,086,710

HEATING APPARATUS

Filed June 23, 1959

2 Sheets-Sheet 1

INVENTOR
ALEXANDER SHIMKO

BY
BLAIR, SPENCER & BUCKLES
ATTORNEYS.

April 23, 1963

A. SHIMKO 3,086,710

HEATING APPARATUS

Filed June 23, 1959

2 Sheets-Sheet 2

INVENTOR
ALEXANDER SHIMKO

BY
BLAIR, SPENCER & BUCKLES.
ATTORNEYS.

United States Patent Office 3,086,710
Patented Apr. 23, 1963

1

3,086,710
HEATING APPARATUS
Alexander Shimko, 48 Turn of River Road,
Stamford, Conn.
Filed June 23, 1959, Ser. No. 822,284
2 Claims. (Cl. 237—2)

This invention relates to systems for heating homes and other structures, and more particularly to heating systems employing a mixture of hot air and flue gases as a circulating heating medium.

Flues embedded in floors and walls have been used for heating buildings since ancient times, and so-called Swedish stoves utilizing heat from flue gases have been employed to heat multi-stored houses in Europe. Such heating systems have generally proved inefficient and wasteful of fuel and have failed to provide enough heat for effective temperature regulation of the heated buildings. Steam, hot water, and warm air heating systems have been developed to provide effective temperature regulation, but these systems require bulky and expensive furnaces or combination furnace-boiler heating units in order to use such heating media effectively. Thus a need has long existed for a simple and effective heating system for buildings and other structures which employ an efficient and economical combustion unit superior to those now available.

Accordingly, it is a principal object of the present invention to provide efficient, safe and economical heating systems for homes and buildings employing a mixture of heated air and hot flue gases as a heating medium.

Another object of the invention is to provide systems of the above character incorporating forced draft circulation of the heating medium through radiator units.

A further object of the invention is to provide a system of the above character including an exhaust gas heat exchanging arrangement for preheating intake air.

A further object of the invention is to provide heating systems of the above character employing a compact, safe, and efficient combustion unit.

Still another object of the invention is to provide a system of the above character adapted for use with a heating gas combustion unit as a heat source.

Another object of the invention is to provide combustion units of the above character incorporating safety controls designed to terminate operation of the system in the event of overheating, failure of fuel supply, pilot flame failure and the like.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
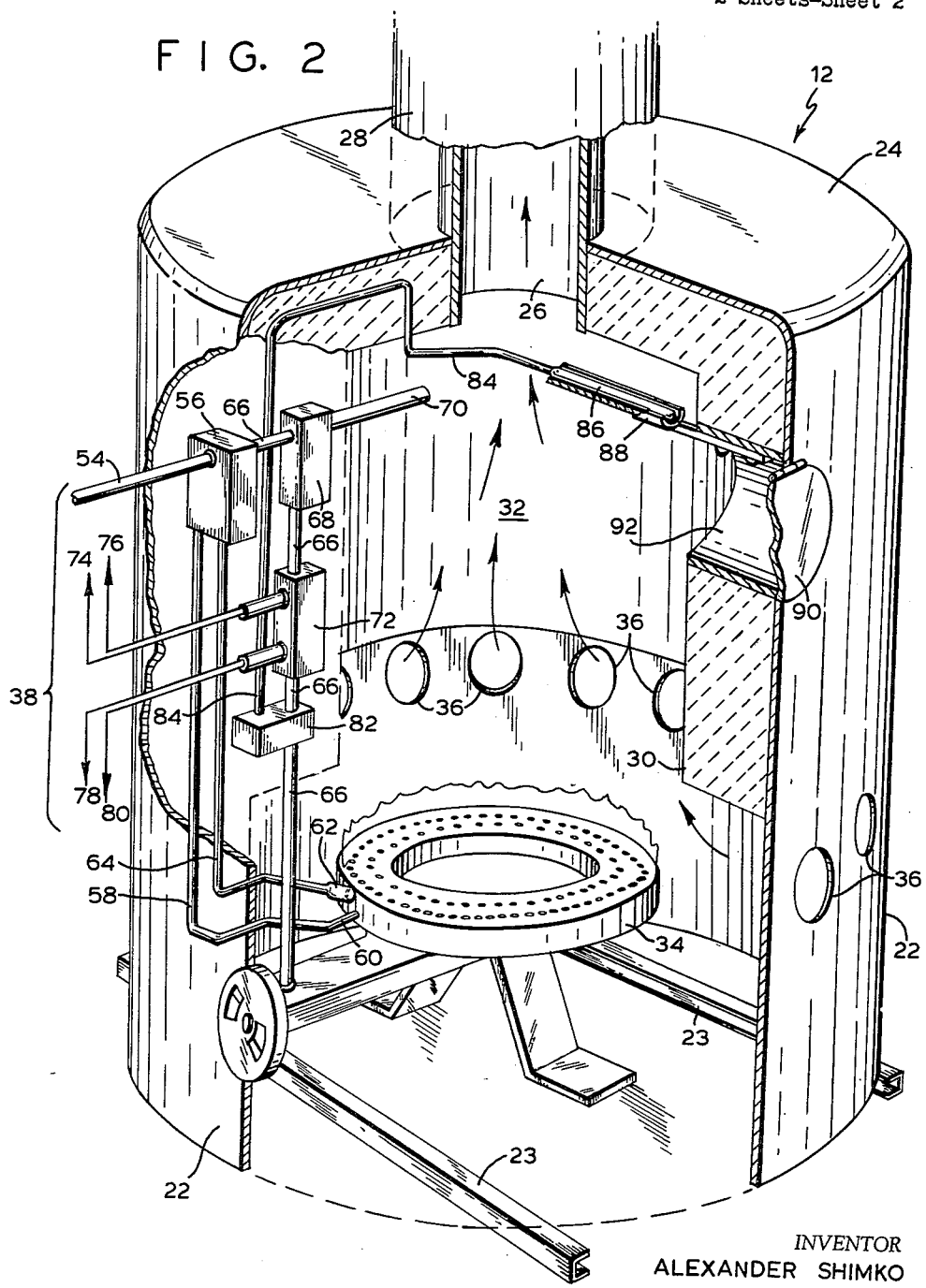

For a fuller understanding of the nature and objects of the invention, reference should be had to the following detailed description taken in connection with the accompanying drawings, in which:

FIGURE 1 is a perspective schematic diagram of a heating system incorporating a preferred embodiment of the present invention, and FIGURE 2 is a cutaway perspective view of a preferred form of combustion unit which may be employed in the systems of the present invention.

Similar reference characters refer to similar elements throughout the several views of the drawing.

A preferred form of heating system incorporating the principles of the present invention is shown in the schematic diagram of FIGURE 1. A heating unit generally indicated at 8 includes a heat exchanger generally indicated at 10 and a combustion unit generally indicated at 12, in which preheated air from heat-exchanger 10 is mixed with and heated by the products of fuel combustion. The mixed hot air and flue gases are conducted by a heat distributing system generally indicated at 14 to a series of radiators 16 and thence by way of heat exchanger 10 to an exhaust pump 20, which draws these gases through the system and expels them to the atmosphere.

A preferred form of applicant's novel combustion unit 12 is shown in FIGURE 2. This unit is housed in a casing 22 having a top portion 24 through which passes a distributing duct or main 26 covered by an insulating sleeve 28. An insulating liner 30 is mounted within the upper portion of casing 22 enclosing a combustion-mixing chamber 32. A combustion element, preferably a gas burner 34, is positioned within the lower portion of casing 22, and air inlet ports 36 are formed around the circumference of casing 22 in the vicinity of burner 34. If desired, casing 22 may be spaced from the floor and supported by base members 23 to admit additional air beneath the lower periphery of casing 22. A group of automatic controls 38 are associated with a thermostat 40 and a pump motor 42, as shown in FIGURE 1, and these controls regulate the operation of combustion unit 12 to provide safe, economical and effective operation of the heating system as a whole.

The operation of the novel and economical combustion unit 12, in heating and mixing intake air with combustion products in combustion-mixing chamber 32 and supplying this mixture of hot air and flue gases to the distributing system 14, provides a uniquely efficient source of heat requiring only a small number of inexpensive structural elements. The need for a water boiler and the attendant bulky and expensive supporting structure is entirely eliminated, and the heating-mixing unit 12 may be made small and compact to achieve many economies in manufacture and installation. The control group 38 and other elements hereinafter described provide many safety features, and permit full compliance with fire and building codes and underwriting regulations.

Referring to FIGURE 1, intake air enters the system through vents 44 in an exterior housing 46 surrounding heating unit 8, and vents 44 may be provided with grills or screens if desired. Vents 44 may draw intake air direct from the atmosphere outside the structure being heated, if desired, and this arrangement will avoid undue cooling of the room or basement where unit 8 is located by cold incoming air. Entering air passes upward around preheating coils 48 of heat-exchanger 10 and thence over a baffle 50 into the space surrounding combustion unit 12 and insulating sleeve 28. The preheated air will be further warmed by these elements, and an insulating and sound-absorbing lining 52 positioned within housing 46 substantially inhibits losses of heat from heating unit 8. The preheating coils 48 are preferably finned or cored for best heat transfer, as indicated in FIGURE 1.

The warm intake air is drawn into ports 36 in combustion unit 12 by the pressure differential created by pump 20, which draws a slight vacuum within the entire distributing system 14 filled by the heated intake air mixed with hot combustion products.

Referring now to FIGURE 2, the intake air passing inward through ports 36 is heated by the flame of combustion element 34 mixed with the hot combustion products therefrom in the combined combustion-mixing chamber 32. The fuel supplied to burner 34 is controlled by the various elements of the control group 38 to achieve the desired operating temperatures throughout the system.

Thus in the preferred combustion unit shown in FIG-

URE 2, a supply line 54 conveys heating gas from a supply main (not shown) to a pilot failure gas cut-off control valve 56. A portion of this gas is fed by way of a pilot supply line 58 to a pilot burner 60 which is designed to burn continuously. The main gas flows through valve 56 to the burner 34 is by way of a line 66. A pilot bulb 62 positioned adjacent pilot burner 60 is connected by a tube 64 to valve 56, and if pilot burner 60 should go out, the resultant cooling of bulb 62 reduces the pressure within line 64, causing valve 56 to close, stopping gas flow through line 66 until pilot burner 60 is re-lighted.

However, additional control valves 68, 72 and 82 are connected in series in line 66 to cut off or regulate the volume of gas passing therethrough. Thus an overheating gas cutoff valve 68, with a temperature-sensing bulb 70 projecting into the combustion-mixing chamber 32, is adjusted to close automatically if the temperature in the chamber exceeds a certain predetermined safe maximum temperature. A gas valve 72 connected by leads 74 and 76 to the thermostat 40 and also connected to an electric power source (not shown), is adjusted to open whenever thermostat 40 calls for heat. Gas valve 72 is also connected by leads 78 and 80 into the control circuit (not shown) of pump motor 42, for automatic simultaneous operation of pump 20 and gas burner 34 when thermostat 40 demands more heat. Accordingly whenever burner 34 is on to produce heat in chamber 32 pump 20 operates to draw the heated gases through the distributing system 14 (FIGURE 1). Additionally, a temperature regulator valve 82 in line 66 is connected by a tube 84 to a temperature-sensing bulb 86 supported in a bracket 88 near the top of combustion-mixing chamber 32. The temperature regulating valve 82 is constructed to regulate the flow of gas to burner 34 at different temperature levels, thereby maintaining the temperature in the upper portion of the combustion chamber 32 within a certain preselected operating range.

The series of valves 56, 68, 72, and 82 thus controls the supply of gas to burner 34, providing ample safety factors and maintaining the combustion unit and heating system in operation as required. It will be understood that one or more of these valves may be combined in multiple-valve assemblies, while still providing the functions described above.

Two additional safety features are included in the preferred form of the present invention. A safety relief valve in the form of a hinge-mounted cover 90 closing a conduit 92 passing through casing 22 and liner 30 provides an escape vent for any explosive pressure build-ups which might occur within combustion-mixing chamber 32. Additionally, a temperature relief valve 94 (FIGURE 1) provides a suction by-pass removing the forced draft from chamber 32 if a predetermined temperature at valve 94 should be exceeded. Thus valve 94 is constructed to vent the distributing system 14 to the atmosphere, and any temperature-sensitive releasing means, such as a bimetallic element or a fusible plug, may be employed to release valve 94 when a predetermined maximum temperature above the normal operating temperature range is reached. Pump 20 thereafter draws air into system 14 through valve 94, and the suction head on chamber 32 is thereby destroyed.

When valves 56, 68, and 82 are open, and when thermostat 40 demands heat, opening valve 72 and initiating operation of pump-motor 42 and burner 34, the mixed hot air and flue gases from chamber 32 are drawn by pump 20 into the heat distribution system 14 shown in FIGURE 1. These mixed hot gases pass through distributing main 26 into suction supply mains 96 by way of temperature relief valve 94 when closed. The hot air and flue gases are drawn from supply lines and risers 96 and one or more supply branch lines 98 to radiators 16, here shown schematically as double-deck fin type radiator units. Any suitable radiator or radiant heating element incorporated in walls, floors, baseboards, pavements or the like may be used in heating buildings or structures with the systems of the present invention. These systems may also be adapted for heating outdoor structures or installations such as bridges, viaducts and paved drives, in order to melt snow thereon, for example. In such cases radiators 16 take the form of conduits embedded wherever heat is desired.

Radiator valves 114 are located in the branch lines 98 adjacent the inlet of each radiator 16, and if desired, an individual thermostatically-controlled outlet valve 116 is positioned adjacent the outlet of each radiator 16.

The mixed hot air and flue gases passing through radiators 16 are drawn therefrom into return mains and risers 100 and thence through balancing valves 104 and 106 into a suction main 108 leading to preheating coils 48 of heat-exchanger 10. Balancing valves 104 and 106 are set to divide the flow of hot gases through parallel branches of the system 14 shown illustratively in FIGURE 1 as upper and lower tiers of radiators 16 such as would be incorporated in a two-story house. Accordingly, valve 106 governs the operation of only two lower radiators 16 by controlling flow therefrom, while valve 104 similarly governs the upper tier of radiators and two lower radiators. By adjustment of valves 104 and 106 to the respective loads of the parallel branches of the system, a substantially uniform distribution of heat to all radiators can be achieved. In many instances these balancing valves may be eliminated, particularly where the parallel branches of the distributing system are of approximately equal length.

The air and flue gas mixture, cooled by its passage through distribution system 14, is drawn through coils 48 where further heat is lost to the incoming air passing these coils. The cool air-flue gas mixture is then drawn by pump 20 to be expelled via exhaust discharge conduit 110 to the atmosphere, preferably at a high point on the building or structure. If a slight downward pitch is given to the generally horizontal sections of the return mains 100, water vapor condensing in system 14 will run downward to pump 20, where it may be drained to an evaporation pan or to the sewer through a check valve 112 designed to close when pump 20 is operating and to open when pumping stops.

The suction pump 20 applies a forced draft pressure differential to achieve effective mixing of intake air and combustion products within the combustion unit 12, and to draw the hot mixture of air and combustion products through distribution system 14 and finally through heat-exchanger 10. Pump 20 also provides an additional safety feature in the system as a whole. The combustion products from gas burner 34 are no more dangerous than those from the gas burners of a conventional gas kitchen range. However these combustion products are entirely confined within the distribution system 14 by pump 20 which maintains therein a pressure slightly below atmospheric during operation. Thus, should a leak develop in the system, the reduced pressure therein would draw air into the system through such leak, avoiding the escape of gaseous combustion products.

The heating unit 8 forms a small and self-contained unit which may be located in the basement or elsewhere in the building or structure to be heated. This unit is as clean and quiet in operation as a kitchen gas range, and it may be made still more self-contained by positioning pump 20 and motor 42 within housing 46 if desired.

The systems of the present invention will produce desired amounts of heat more quickly following demand than many other systems, for the valves 68 and 82 may be adjusted to provide the highest temperatures permitted by local codes or underwriting regulations at the entrance to distributing main 26, such as temperatures of 325° to 350° F., for example. The mixed hot air-flue gas heating medium may thus be considerably hotter than other heating media, such as water or wet steam, commonly employed in heating systems. The forced draft created by the suction blower or pump 20 provides quick circulation of this heat-carrying medium through system 14, making the heat available more quickly when it is needed. The quick availability of heat provides a particularly useful advantage for intermittently-heated structures such as theaters, assembly halls, houses of worship, and the like.

The use of a gas burner 34 in the combustion unit 12 affords the advantages of a hot, automatically controllable and clean-burning flame producing gaseous combustion products substantially free of liquid or solid particles and well adapted for circulation through the distribution system 14. The compactness of heating-mixing unit 12 is also an advantage where space is limited, and particularly in such vehicles as boats, ships, aircraft, and the like.

The simplicity and economy of the heating systems described above make them useful for heating all kinds of buildings, for industrial heating of such enclosures as drying rooms and paint-baking ovens, and for snow removal on the pavements of bridges, driveways, tunnel entrances, and the like.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which, as a matter of language might be said to fall therebetween.

I claim:
1. A heating system utilizing a mixture of the products of combustion and hot air as the sole circulating heating medium comprising a combustion chamber, a gas fuel burner therewithin, pipe means for supplying gas heating fuel to said burner, a combustion gas-hot air radiator adapted to be located in a habital quarter removed from the combustion chamber of said burner, piping means connecting said combustion chamber to said radiator for supplying the fluid heating medium thereto, exhaust pump-operated piping means connecting said radiator to the atmosphere and adapted to extend beyond a habital quarter to remove the heating medium from the radiator and thereby adapted to insure non-contamination of a habital quarter by said heating medium, a temperature sensing device in close proximity to said heating medium within said combustion chamber, a first cut off valve connected to said gas fuel supply means and to said temperature sensing means for terminating the flow of gas fuel to said burner at a predetermined overheat temperature setting of said temperature sensing device within the combustion chamber, a second temperature sensing device adapted to be located in a habital quarter, a second cut off valve in series with the first cut off valve located in said pipe for regulating the normal supply of gas fuel to said burner, said second temperature sensing device adapted to be located in a habital quarter under the influence of said radiator for controlling said second cut off valve, a third temperature sensing device closely proximate to said burner and responsive to the temperature of said heating medium near its exit from said combustion chamber, a third temperature regulating valve in series with said first and second temperature regulating valves for regulating the flow of gas fuel in volume to said gas burner in inverse relation to the temperature valve device controlling the operation of said third temperature regulating valve, a pilot burner in said gas burner, a temperature sensing bulb associated with said pilot burner, a fourth gas cut off and pilot failure valve in said gas fuel supply pipe means in series with and ahead of said other three cut off valves, said first, second, and third and fourth valves all being directly connected in series to each other whereby the first cut off valve operates as a safety valve in terminating the flow of gas fuel, the second cut off valve operates as an on and off valve, and the third regulating valve operates to permit the constant flow of gas in varying volumes so that the required predetermined temperatures of the exiting gases are satisfied, and the fourth operates to turn off the gas flow on failure of the pilot.

2. A heating system utilizing a mixture of the products of combustion and hot air as the sole circulating heating medium as defined in claim 1, and a casing separated by a baffle wall to provide two compartments therewithin, said baffle wall having a top opening communicating between the two compartments, said combustion chamber being mounted in one of the compartments, a heat exchanger connected in the exhaust pump-operated piping means, said heat exchanger being mounted in the other compartment at the opposite side of the baffle from the combustion chamber and air openings in the casing for admitting air to the bottom of the heat exchanger compartment.

References Cited in the file of this patent
UNITED STATES PATENTS

| | | |
|---|---|---|
| 1,177,859 | Gilbert | Apr. 4, 1916 |
| 1,765,977 | Harrison | June 24, 1930 |
| 1,943,053 | Boisset | Jan. 9, 1934 |
| 2,005,224 | Dunham et al. | June 18, 1935 |
| 2,292,830 | Gauger et al. | Aug. 11, 1942 |
| 2,396,102 | Jackson | Mar. 5, 1946 |
| 2,486,160 | Holmberg | Oct. 25, 1949 |
| 2,913,182 | Bryce et al. | Nov. 17, 1959 |